(12) United States Patent
Morishima

(10) Patent No.: US 7,230,900 B2
(45) Date of Patent: Jun. 12, 2007

(54) OPTICAL DISK APPARATUS AND COMPUTER READABLE RECORDING MEDIUM STORING PROGRAM

(75) Inventor: Morito Morishima, Fukuroi (JP)

(73) Assignee: Yamaha Corporation, Hamamatsu-shi (JP)

(*) Notice: Subject to any disclaimer, the term of this patent is extended or adjusted under 35 U.S.C. 154(b) by 412 days.

(21) Appl. No.: 10/857,304

(22) Filed: May 28, 2004

(65) Prior Publication Data

US 2005/0036767 A1    Feb. 17, 2005

(30) Foreign Application Priority Data

May 30, 2003 (JP) .................... P. 2003-154740

(51) Int. Cl.
*G11B 7/00* (2006.01)

(52) U.S. Cl. .................. 369/59.24; 369/59.11; 369/59.14

(58) Field of Classification Search ............... None
See application file for complete search history.

(56) References Cited

U.S. PATENT DOCUMENTS

| | | | | |
|---|---|---|---|---|
| 5,436,643 A | * | 7/1995 | Yamaguchi et al. | 347/179 |
| 5,666,338 A | * | 9/1997 | Ishizawa et al. | 369/47.23 |
| 5,696,558 A | * | 12/1997 | Tsukamoto | 386/124 |
| 5,724,364 A | * | 3/1998 | Mori et al. | 714/709 |
| 5,748,607 A | | 5/1998 | Ohira | |
| 6,363,043 B1 | * | 3/2002 | Kondo | 369/53.21 |
| 6,587,417 B2 | * | 7/2003 | Okamoto et al. | 369/59.22 |
| 6,633,526 B1 | * | 10/2003 | Imade et al. | 369/59.23 |
| 6,754,158 B1 | * | 6/2004 | Kobayashi et al. | 369/59.11 |
| 2001/0026531 A1 | | 10/2001 | Onodera et al. | |
| 2003/0107959 A1 | * | 6/2003 | Norton et al. | 369/53.29 |
| 2004/0095866 A1 | * | 5/2004 | Morishima et al. | 369/59.24 |

FOREIGN PATENT DOCUMENTS

| | | |
|---|---|---|
| EP | 0 643 391 A1 | 3/1995 |
| EP | 1 143 426 A2 | 10/2001 |
| EP | 1 422 697 A2 | 5/2004 |

* cited by examiner

*Primary Examiner*—Thang V. Tran
(74) *Attorney, Agent, or Firm*—Morrison & Foerster LLP

(57) ABSTRACT

An optical disk apparatus for forming an image on an optical disk according to dot data which defines density of dots of the image, the optical disk apparatus includes: a framing unit which makes a frame data by grouping a plurality of unit data, wherein when the dot data are treated as the unit data; a pit forming unit which sequentially forms pits defined by a bit train signal of the frame data; a discrimination unit which determines whether the section in the frame data corresponding to the dot data is a predetermined value; and a gate unit which, in case the discrimination result by the discrimination unit is affirmative, supplies the bit train signal to the pit forming unit and, in case the discrimination result by the discrimination unit is negative, interrupts supply of the bit train signal to the pit forming unit.

5 Claims, 15 Drawing Sheets

<RECORDING SURFACE>

<DEINTERLEAVING>

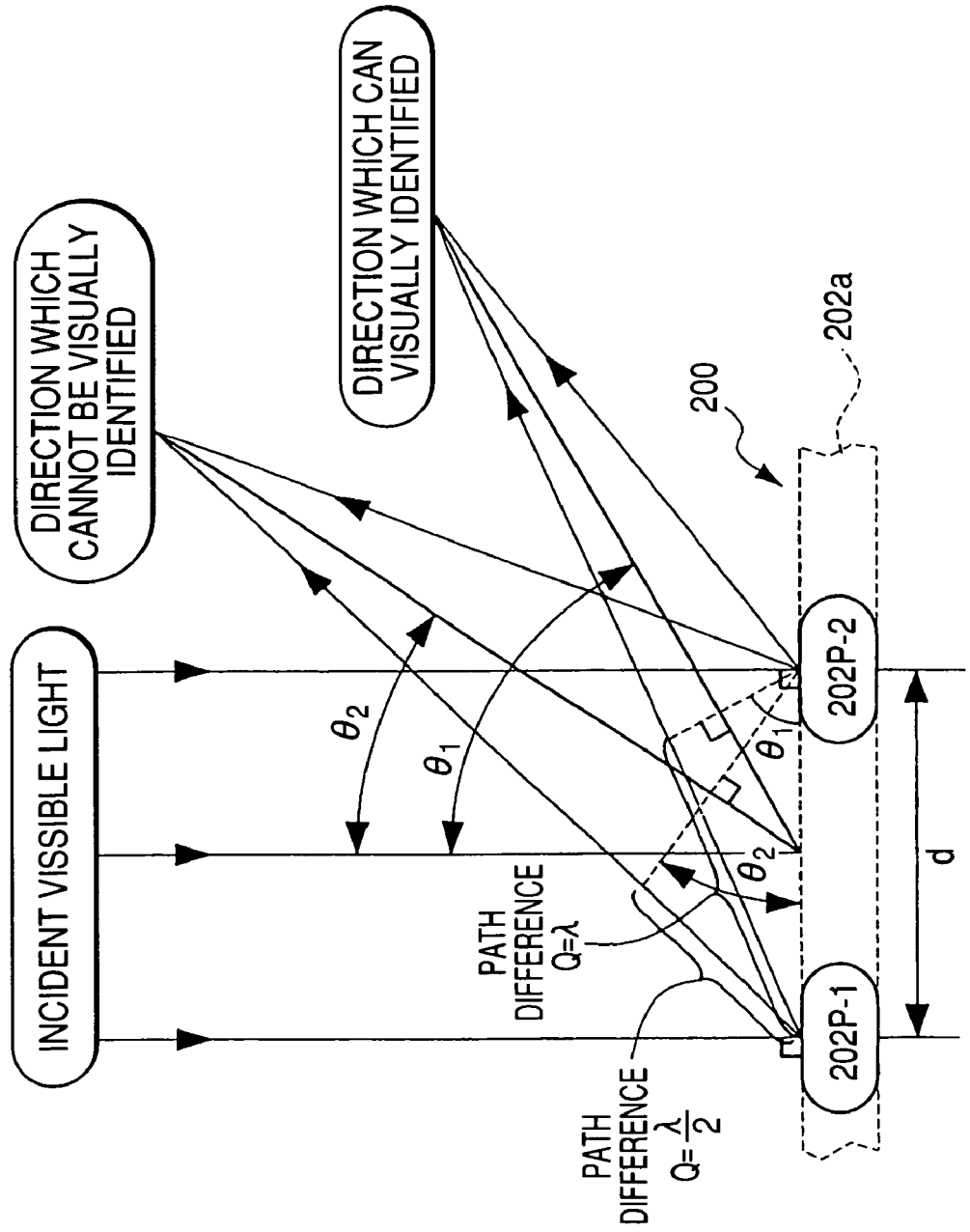

OPTICAL DISK APPARATUS AND COMPUTER READABLE RECORDING MEDIUM STORING PROGRAM

BACKGROUND OF THE INVENTION

The present invention relates to an optical disk apparatus having a function of recording data onto an optical disk as well as a function of forming an image.

Some of the optical disk apparatuss available in recent years have an image forming function of forming an image of a character or a figure in addition to a recording function of recording data such as audio data onto an optical disk including a CD-R (Compact Disc-Recordable) (for example, refer to the Japanese Patent Laid-Open No. 7530/1996). This type of optical disk apparatus irradiates with laser light a recording surface on which data is recorded to change the color of part of the recording surface by means of heat, thereby forming an image of a character or a figure.

The image forming feature incorporated into an optical disk apparatus leads to a more complicated design of the optical disk apparatus, which results in an increase in device cost. A longer time required to form an image onto an optical disk or poor picture quality will impair the added value.

SUMMARY OF THE INVENTION

The invention has been accomplished in view of such circumstances and aims at providing an optical disk apparatus capable of forming a high-quality image onto an optical disk at a high speed while preventing an increase in the device cost, and a program which supplies image data required by the optical disk apparatus.

In order to solve the aforesaid object, the invention is characterized by having the following arrangement.

(1) An optical disk apparatus for forming an image on an optical disk according to dot data which corresponds to intensity and period of dots of the image, the optical disk apparatus comprising:
a framing unit which makes a frame data by grouping a plurality of unit data, wherein when the dot data are applied to the optical disk apparatus, the dot data are treated to be the plurality of unit data;
a pit forming unit which sequentially forms pits defined by a bit train signal of the frame data;
a discrimination unit which determines whether a section in the frame data corresponding to the dot data is a predetermined value; and
a gate unit which, in case the discrimination result by the discrimination unit is affirmative, supplies the bit train signal to the pit forming unit in a certain period of the dot period and, in case the discrimination result by the discrimination unit is negative, interrupts supply of the bit train signal to the pit forming unit.

(2) The optical disk apparatus according to (1), wherein the gate unit supplies the bit train signal to the pit forming unit only in a predetermined dot period required for formation of one dot in the case the discrimination result is affirmative, and interrupts supply of the bit train signal to the pit forming unit in the predetermined dot period (3) The optical disk apparatus according to (2), wherein the framing unit, when making the frame data by grouping the plurality of unit data supplied from a host computer, adds parity data to correct a code error of the plurality of unit data and synchronization data, and
the optical disk apparatus further comprises time axis expander unit which divides, by the number of dot data included in one frame data, at least a period obtained by subtracting a period of the synchronization data from a period in which the framed data is output, and set the divided period as the predetermined dot period.

(4) An optical disk apparatus for forming an image on an optical disk according to dot data which defines density of dots of the image, the optical disk apparatus comprising:
a framing unit which makes a frame data by grouping a plurality of unit data, wherein when the dot data are applied to the optical disk apparatus, the dot data are treated as the plurality of unit data;
a strategy circuit which corrects a bit train signal of the frame data to form pits defined by the bit train signal on the optical disk; and
a pit forming unit which applies laser light modulated by the corrected bit train signal and sequentially forms pits onto the optical disk;
wherein the strategy unit modifies the correction by the strategy circuit so as to shorten or elongate a pit defined by the bit train signal in accordance with an instruction from outside.

(5) A computer readable recording medium storing program which causes a computer to which an optical disk apparatus is connected, the optical disk apparatus comprising:
a framing unit which interleaves a plurality of unit data corresponding to dot data which specifies density of a dot to be formed onto an optical disk in the order the dot data are supplied and makes a frame data; and a pit forming unit which forms a pit train according to the frame data so that the density specified by the dot data to be processed will be obtained, the program causing the computer to function as:
an acquisition unit which groups a plurality of dots positioned on the same radius of an image defined in polar coordinates and which acquires dot data defining the density of each of the plurality of dots included in each group; and
a deinterleaving unit which rearranges the dot data acquired by the acquisition unit and supplies the rearranged dot data to the optical disk apparatus so that the arrangement of dot data after the interleaving will match the arrangement of the dots in the direction of an angle in polar coordinates.

BRIEF DESCRIPTION OF THE DRAWINGS

FIG. 15 illustrates the diffraction phenomenon in a hologram.

DETAILED DESCRIPTION OF PREFERRED EMBODIMENTS

Embodiments according to the invention will be described referring to the attached drawings.

<First Embodiment>

Figure 1:
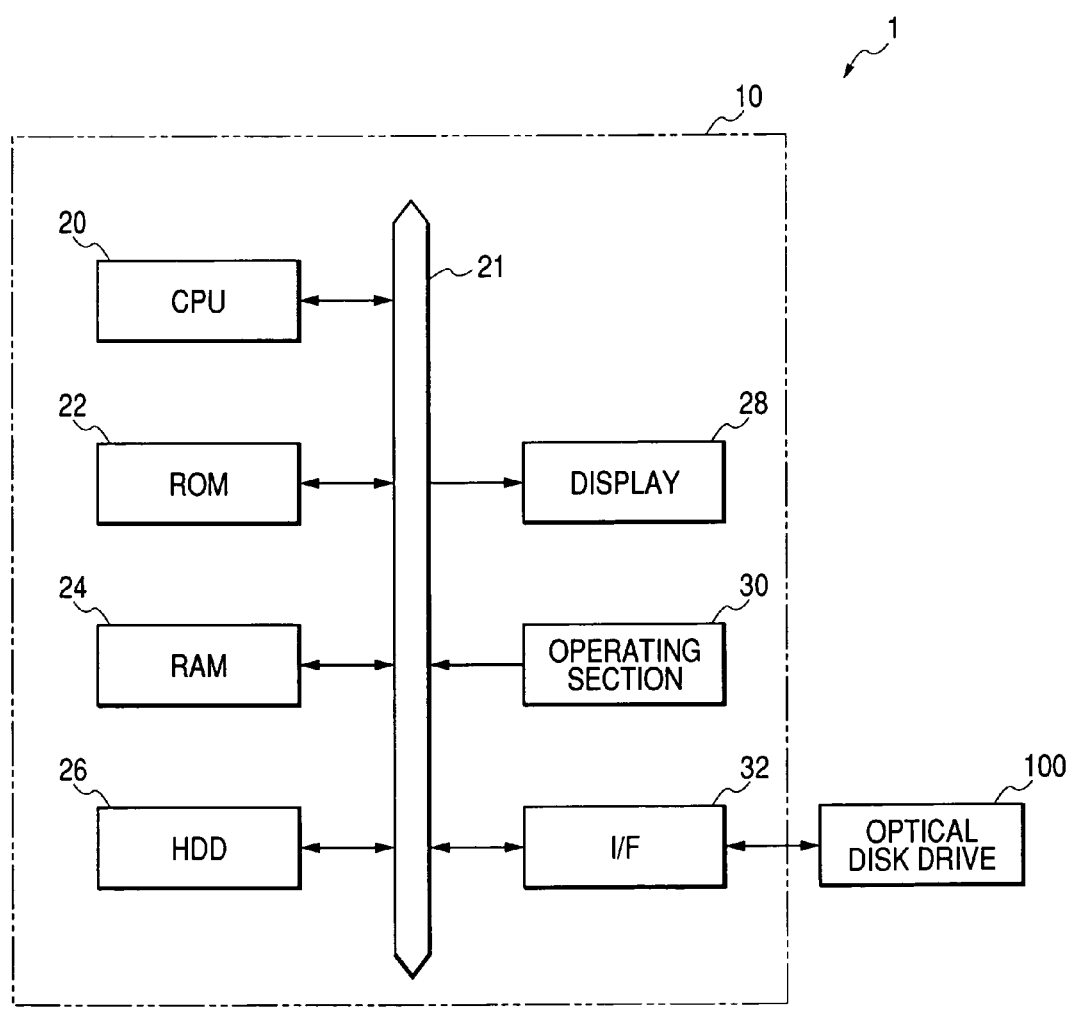
FIG. 1 is a block diagram showing the entire system configuration including an optical disk apparatus according to a first embodiment of the invention.

FIG. 1 is a block diagram showing the entire system configuration including an optical disk apparatus according to a first embodiment of the invention. As shown in FIG. 1, a system 1 comprises a host compute 10 connected to an optical disk apparatus 100 according to this embodiment. The host computer 100 comprises a CPU 20, a ROM 22, a RAM 24, an HDD (Hard Disk Drive) 26, a display 28, an operating section 30, and an interface 32 interconnected to each other via a bus 21. The HDD 26 stores an operating system as well as an application program for forming an image. The CPU 20 executes the application program to implement functional blocks mentioned later and processes image data and supplies the processed image data to the optical disk apparatus 100. In this embodiment, IDE (ATAP1) is used as a connection standard for the optical disk apparatus 100. The operating section 30 includes a keyboard and a mouse which inputs an operation instruction from the user.

<Optical Disk Apparatus>

Figure 2:
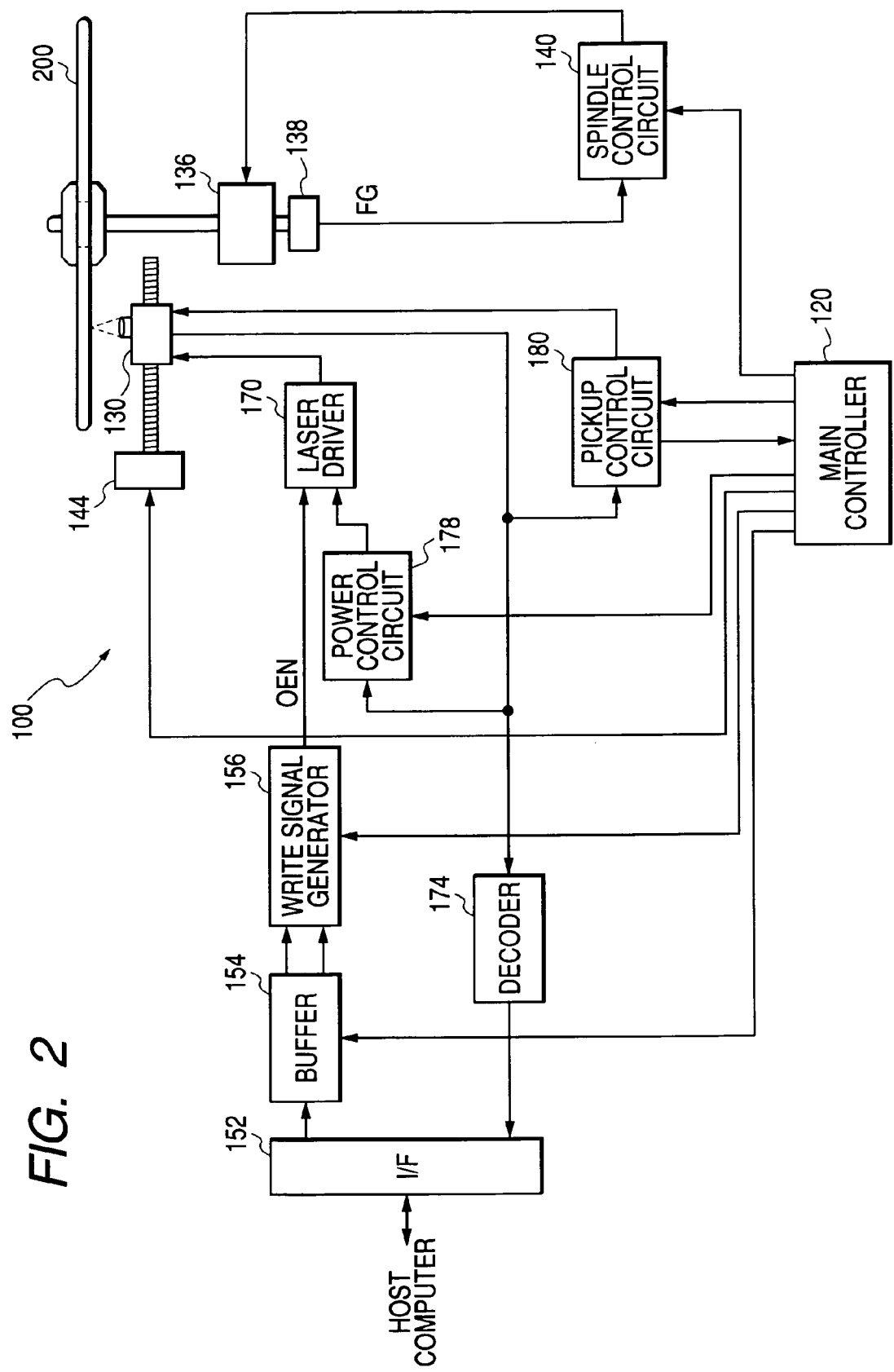
FIG. 2 is a block diagram showing the configuration of the optical disk apparatus 100.

FIG. 2 is a block diagram showing the detailed configuration of the optical disk apparatus 100. In FIG. 2, a main controller 120 controls each section of the system and outputs various types of clock signals in accordance with a program stored in the memory (not shown) provided therein. The optical disk 200 is set so that its recording side will face a pickup 130 and is rotated by a spindle motor 136.

A rotation detector 138 generates for example eight pulses in a period when the spindle motor 130 makes one turn and outputs the pulse signal as a detection signal FG. The optical disk apparatus 100 conforms to the CAV (Constant Angular Velocity) system in which the angular velocity is constant. A spindle control circuit 140 performs feedback control of the spindle motor 136 under an instruction from the main controller 120 so that the rotation speed indicated by the detection signal FG will be constant.

Although details are omitted, generally speaking, the pickup 130 integrates a semiconductor laser (oscillator) for emitting laser light, a photo-detector for detecting the intensity of the laser light reflected onto the optical disk 200 (return light), a focus actuator for driving an objective lens to gather the laser light in the direction approaching or deviating from the optical disk 200, and a tracking actuator for operating the tracking of the laser light. The pickup 130 is engaged with the rotation spindle of a stepping motor 144. Rotation of the spindle motor 144 is controlled by the main controller 120. The pickup 130 is thus subject to feed control in the radius direction of the optical disk 200 by the main controller 120.

The semiconductor laser in the pickup 130 emits laser light at the intensity corresponding to a drive current supplied from the laser driver 170. The return light of the laser light is converted to an electric signal by the photo-detector. The electric signal is supplied to a decoder 174, a power control circuit 178 and a pickup control circuit 180 respectively.

The interface (I/F) 152 connects to the host computer 10. In this embodiment, the interface (I/F) 152 inputs recording data to be recorded in data recording while inputs image data processed as mentioned later in image formation. A buffer 154 which is a first-in, first-out type temporarily stores the data input from the interface 152. The data is read out in synchronization with the rotation of the optical disk 200 detected by the main controller 120.

Although details are mentioned later, a write signal generator 156 supplies to a laser driver 170 a signal OEN to indicate whether to apply laser light at a write level or a servo level in accordance with the data read from the buffer 154. The write level refers to a level sufficient for, when laser light at the level is applied to a recording layer (not shown) of the optical disk 200, the recording layer to be discolored by heat to form pits. The servo level refers to the level at which the recording layer is not discolored by heat even when laser light at the level is applied to the recording layer of the optical disk 200. The servo level is used for focus control or tracking control.

The laser driver 170 generates a drive current which corresponds to the level specified by the signal OEN and which causes an error signal supplied from the power control circuit 178 to become zero and supplies the drive current to the semiconductor laser of the pickup 130.

The power control circuit 178 detects the intensity of the return light of the laser light actually applied by the semiconductor laser based on an electric signal from the photo-detector of the pickup 130 as well as calculates the error between the actual intensity and the target intensity to supply the error signal to the laser driver 170.

The target intensity of the laser light previously stored in the main controller 120 is read and supplied. Its value is an optimum value obtained by way of recording and experiments. For the CAV system where the angular velocity is constant, the linear velocity increases as the laser light approaches the edge of the optical disk 200. So that the power control circuit 178 makes correction so that the target intensity at the write level will increase as the irradiation spot of laser light moves outward. In this way, the intensity of the laser light irradiated from the pickup 130 is appropriately controlled in accordance with the irradiation position on the optical disk 200.

The pickup control circuit 180 generates a focus error signal and a tracking error signal respectively by using a known technology on the basis of an electric signal from the photo-detector in the pickup 130 as well as drives the focus actuator in the direction where the focus error signal becomes zero and drives the tracking actuator in the direction where the tracking error signal becomes zero. In this way, the objective lens is focus-controlled so that it will maintain a distance to the surface of the optical disk 200 and focus on its recording surface, and tracking-controlled so that the focal spot of laser light will follow the track (pre-groove) of the optical disk 200.

<Write Signal Generator>

Figure 3:
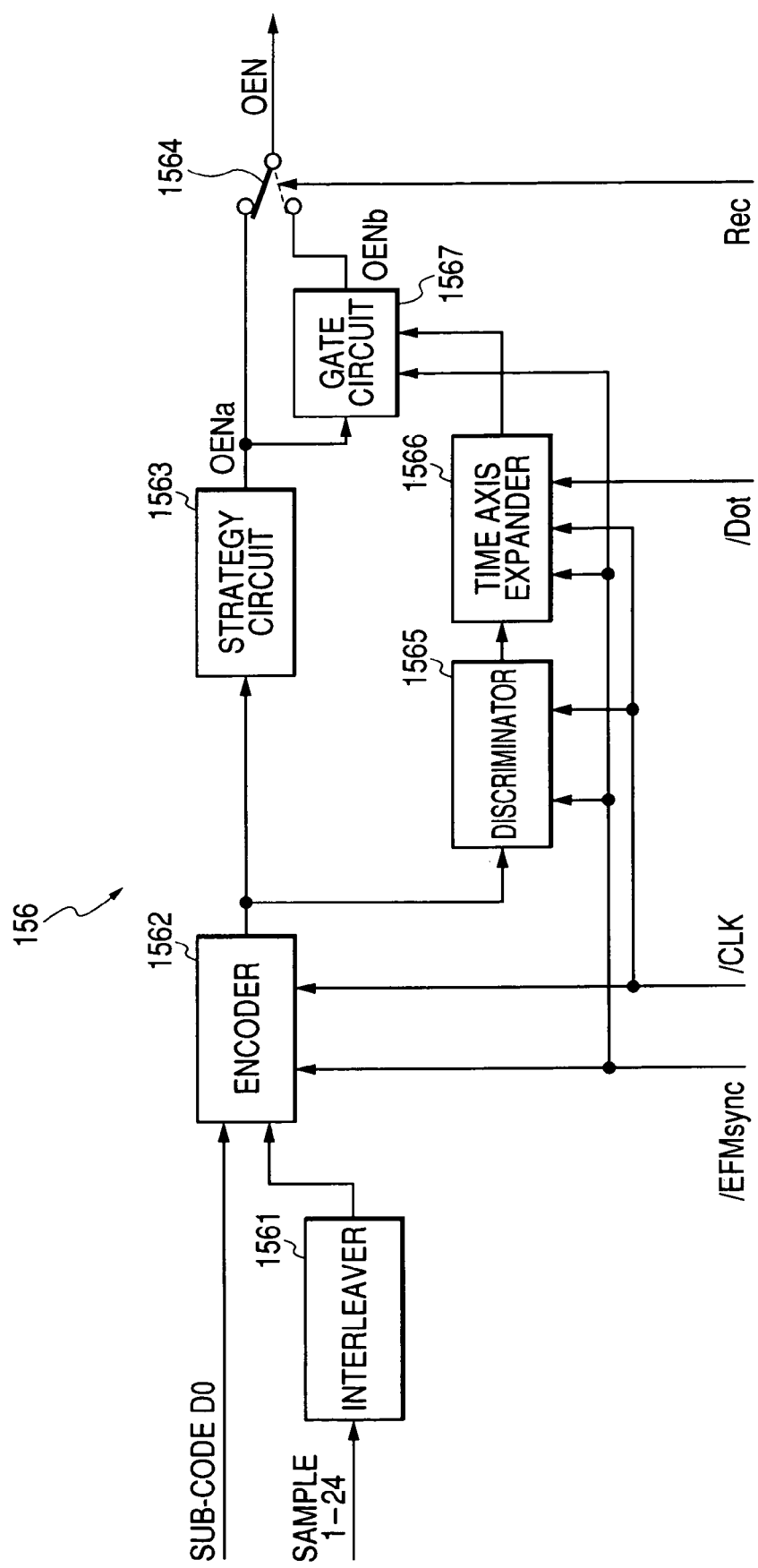
FIG. 3 is a block diagram showing the configuration of a write signal generator in the optical disk apparatus.

Next, the detailed configuration of the write signal generator 156 is described referring to FIG. 3. The write signal generator 156 performs data processing assuming 25-bit data as a single unit. One byte of the 25-bit data is one added as a sub-code data D0. The remaining 24 bytes are main data to be recorded such as audio data. In this example, the 24 bytes are called samples 1 through 24 in order for discriminating each byte.

Figure 4:
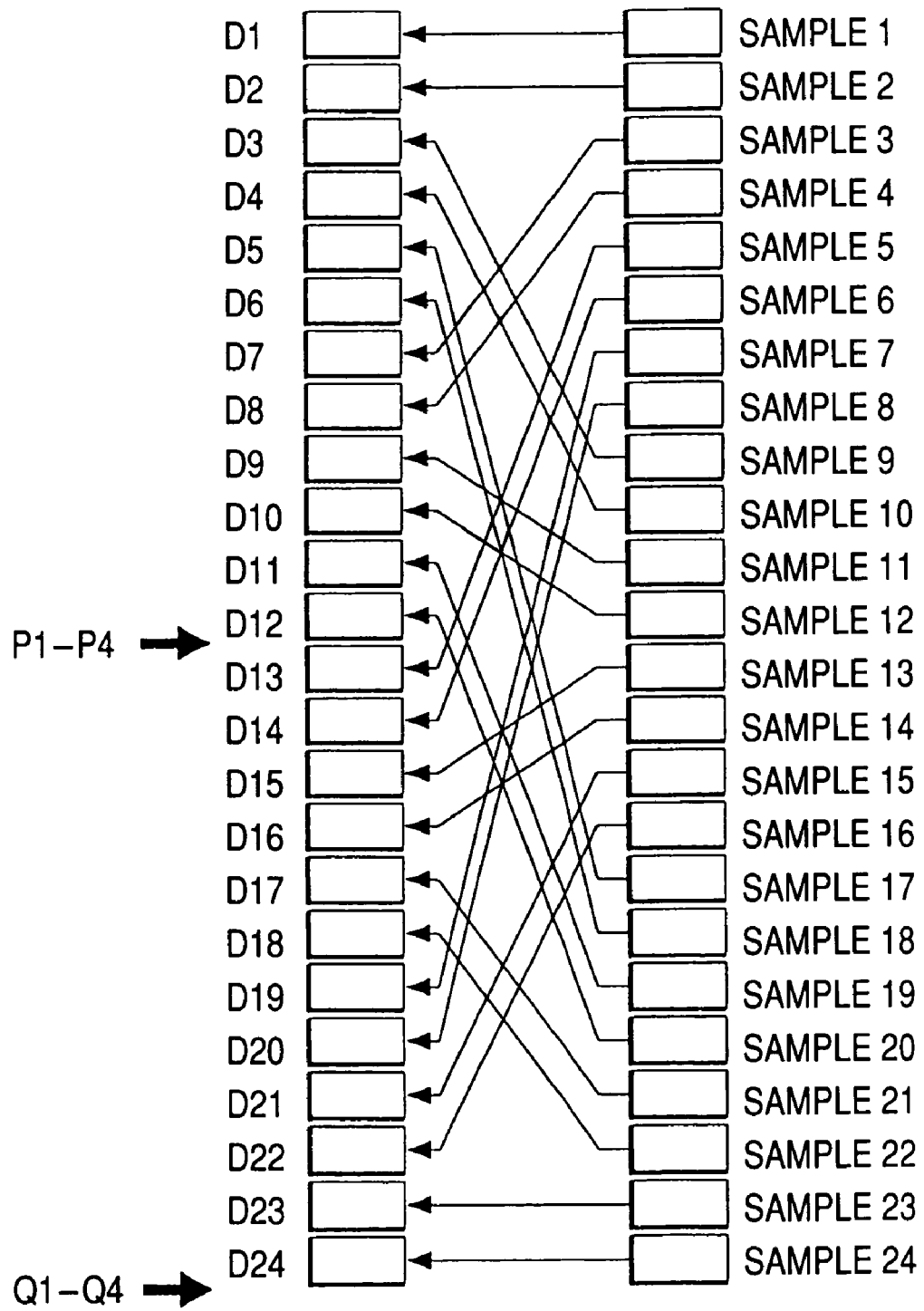
FIG. 4 shows the interleaving process in the optical disk apparatus.

An interleaver 1561 interleaves the samples 1 through 24 for example as shown in FIG. 4. In FIG. 4, for example sample 3 corresponds to main data D7 after interleaving.

The interleaver 1561 adds parity data for correcting the errors of samples 1 through 24, four bytes between main data D12 and D13 and four bytes immediately after main data D24. That is, immediately after main data D12 is added parity data P1 through P4 and immediately after main data D24 is added parity data Q1 through Q4, respectively.

Figure 5:
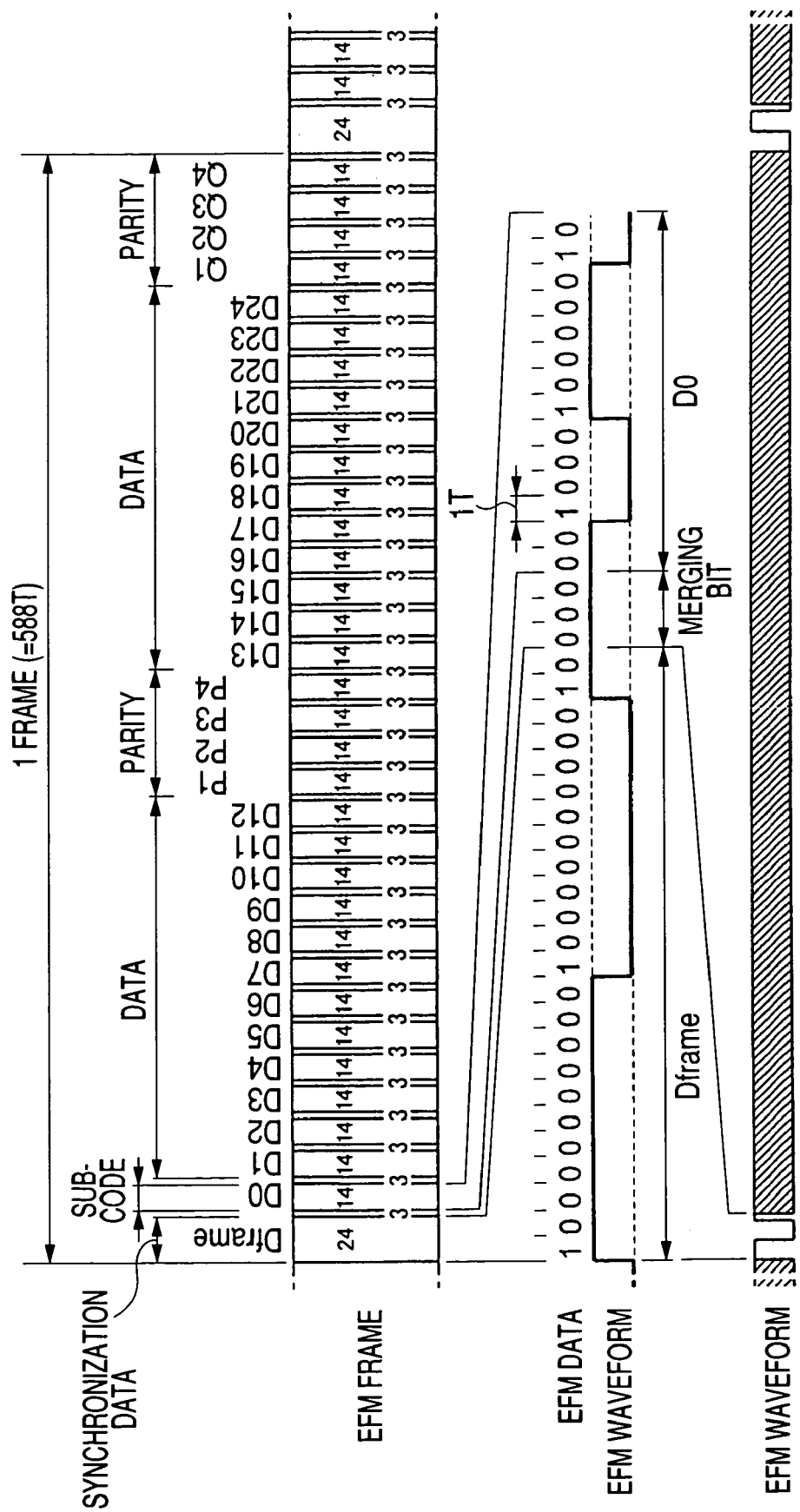
FIG. 5 shows an EFM frame in the optical disk apparatus.

An encoder 1562 then performs EFM (Eight to Fourteen Modulation) on one-byte sub-code data D0 and 24-byte main data D1 through D24 processed by the interleaver 1561 as well as parity data P1 through P4 and Q1 through Q4 being eight bytes, total 33 bytes, to 16-bit data and frames the 16-bit data in the format shown in FIG. 5

In the framing process, the encoder 1562 adds 24-bit synchronization data Dframe of a predetermined bit pattern at the beginning of a frame and inserts three merging bits between the (post-14-bit-conversion) sub-code data D0, main data D1 through 24, parity data P1 through P4 and Q1 Q4, respectively. As a result, one frame includes 588 bits.

Arrangement of the bits of frame data in chronological order is called EFM data as shown in FIG. 5. When the bit "1" of the EFM data is level-reversed in a waveform, the period when the EFM waveform (bit train signal) is for example high defines a period (or length) when pits are to be formed on the optical disk 200, and the period when the EFM waveform is low defines the period of land as a pit space. On the EFM waveform, a unit period corresponding to one bit is represented as IT.

Three merging bit shave four patterns; "000", "100", "010" and "001" (all binary notation). A pattern is chosen which satisfies the conditions that "0" between "1s" is consecutive within the range of 2 through 10 0s even when the pattern is inserted between data items and that, in case "+1" (decimal notation) is given when the EFM waveform is high and "−1" when it is low, the cumulative value per unit time (for example 17T) is closest to "0". Thus, the duration of the same level for the EFM waveform is any of 3T through 11T and, as a result, the EFM waveform has a duty ratio of about 50% for any portion extracted.

To the encoder 1562 is supplied various types of clock signals from the main controller 120 to execute framing. Of these clocks, a clock signal CLK is generated by a master clock and has a cycle of IT. A clock signal/EFMsync is driven low every 5888 cycles of the clock signal CLK. Thus, the encoder 1562 counts the clock signal CLK as well as resets the count result by way of the fall of the clock signal/EFMsync thereby recognizing the chronological position in a frame.

Figure 6:
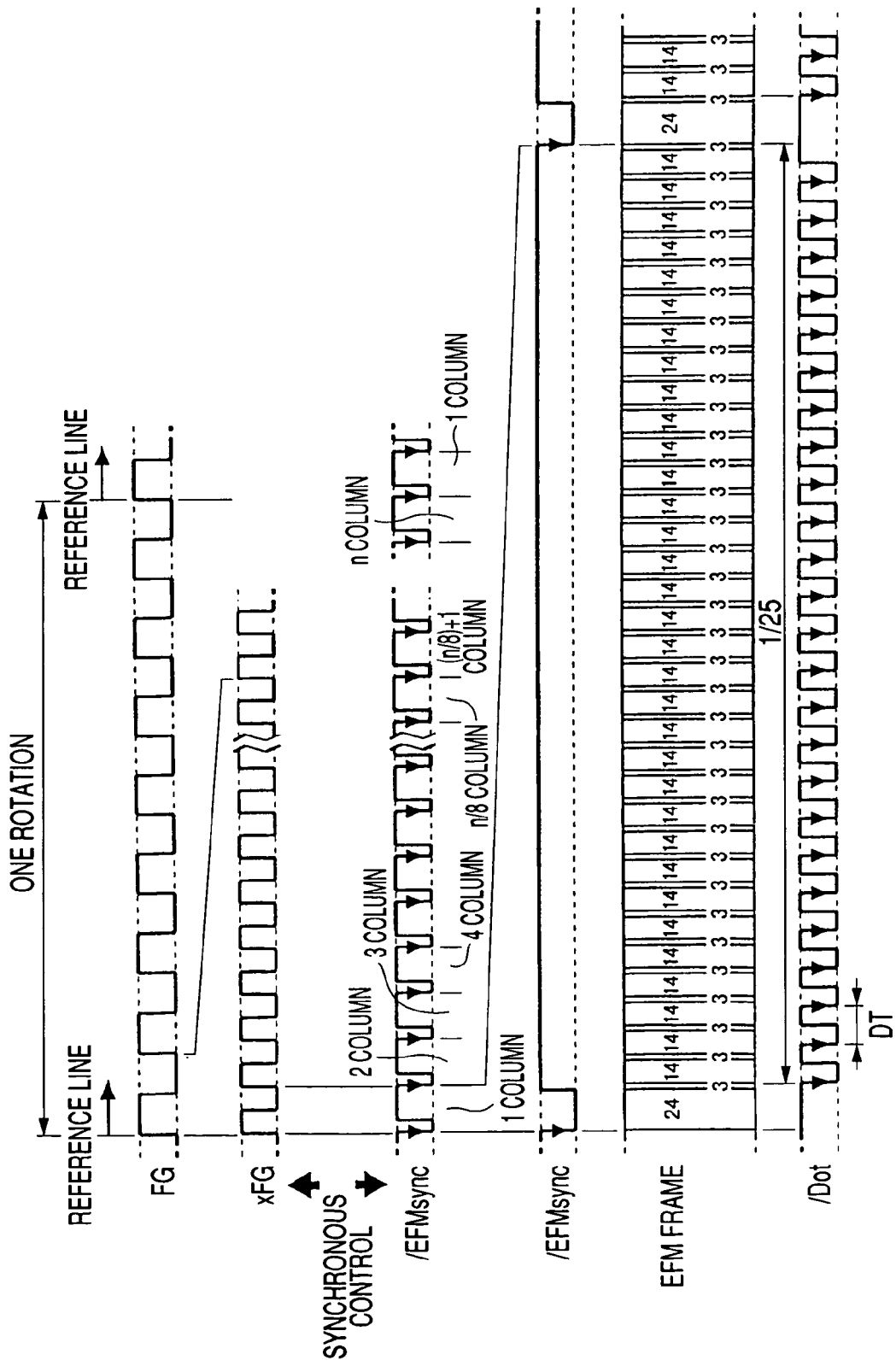
FIG. 6 is a timing chart showing the relationship between the rotation of the spindle motor and various signals.

As shown in FIG. 6, the spindle control circuit 140 controls the rotation of the spindle motor 136 so that the cycle of a signal xFB obtained by multiplying the frequency of a signal FG detected by the rotation detector 138 will match the cycle of the clock signal/EFMsync.

Thus, the frequency-multiplied signal xFG corresponds to a period when the optical disk 200 rotates by a minute angle. The area corresponding to the minute angle on a track of the optical disk 200 (area corresponding to a train in FIG. 6) becomes the one-frame storage area.

The strategy circuit 1563 corrects the EFM waveform and outputs the resulting waveform as a signal OENa. As mentioned above, the EFM waveform defines pits (and land) to be formed on the optical disk 200. When the EFM waveform is driven high, applying laser light at the write level "as it is", the pits formed do not match the EFM waveform. The reason: even in case laser light is applied "as it is" when the EFM waveform is driven high, the recording layer of the optical disk is not sufficiently heated, so that pits are formed in teardrops growing from a thin shape to a thicker shape, or in case laser light is turned off "as it is" when the EFM waveform is driven low, the pits are deformed by elongation, in particular in the shape of a start posit and an end point, due to residual heat.

A signal Rec is supplied from the main controller 120 and instructs data recording when it is driven high. The signal OENa is supplied to one of the input ends of a switch 1564 from the strategy circuit 1563. In case the signal Rec is driven high and data recording is instructed, the signal OENc is supplied as a signal OEN to the laser driver 170 (see FIG. 1), along a solid line in FIG. 3. The signal OENa is a signal obtained by correcting the EFM waveform by the strategy circuit 1563, so that laser light is applied in accordance with the signal modulated with the EFM waveform. In case the signal Rec is driven low and image formation is instructed, the switch 1564 follows the broken line in FIG. 3 to supply as a signal OEN the signal OENb fed to the other input end to the laser driver 170.

For data recording, recording data supplied by the host computer 10 is stored in the buffer 154 then read as each item of main data D1 through D24, byte by byte in order. Further, the data undergoes interleaving, incorporates parity data, and framed by the encoder 1562 to form pits matching the logical level of the EFM waveform on the optical disk 200.

For data regeneration, laser light is applied to pits and an electric signal indicating its return light is supplied to the decoder 174 (see FIG. 1) to obtain regenerated data. The decoder 174 detects the intensity of the return light base on the electric signal from the photo-detector and detects the synchronization data Dframe from a change in the intensity. The decoder 174 then returns the data to 8-bit data by way of EFM demodulation and performs correction of an error if any, and executes deinterleaving opposite to FIG. 4 to obtain regenerated data.

Figure 7A:
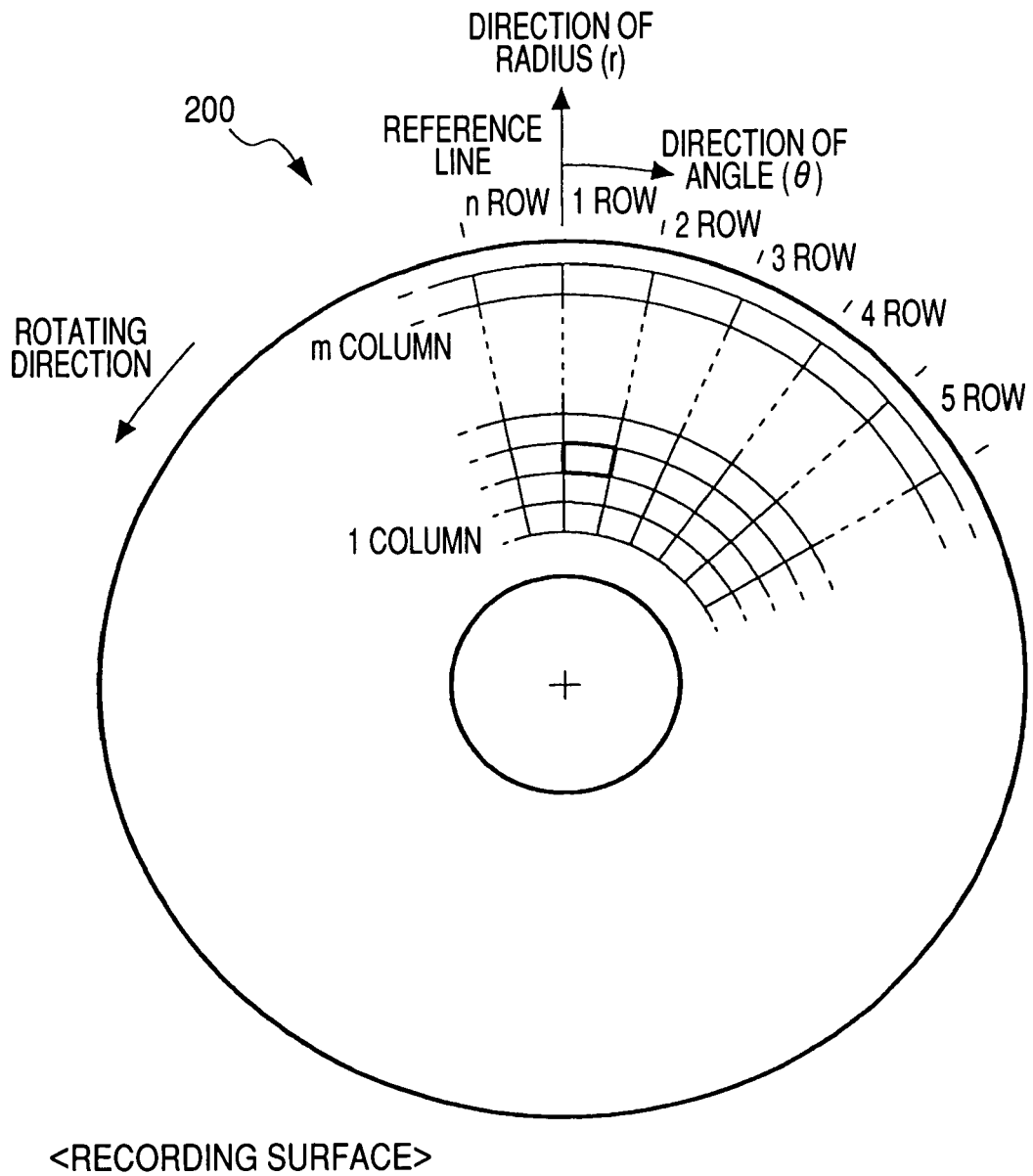
FIGS. 7A and 7B illustrate the dots of an image to be formed onto an optical disk.
Figure 7B:
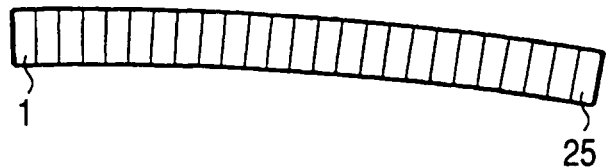

In this embodiment, for ease of explanation, dot arrangement of an image formed onto the optical disk 200 is described below referring to FIG. 7A. As shown in FIG. 7A, on the optical disk 200, sectors are arranged concentrically from the first row to mth row, starting from the inner radius toward the outer radius, and per predetermined angle in radial direction from the first column to the nth column clockwise on the optical disk 200. Each sector has an area equally divided into 25 sub-areas in the direction of perimeter, as shown in FIG. 7B. In this embodiment, the one area corresponds to a dot of an image to be formed. Thus, in this embodiment, dots are arranged in a matrix of m rows by 25·n columns. In this embodiment, these dots are represented in binary form of white or black dots. As dot data representing white or block of one dot, one byte (eight bits) is assigned. In case the dot data is "00000000" ($00 in hexadecimal notation), a white dot is specified. In case the dot data is other than "00000000", a black dot is specified.

Pits are not formed for white dots while pits are formed for black dots and the reflectivity of the optical disk 200 is lowered to represent an image by means of the difference in the reflectivity. While only white or black dots are formed in this embodiment, the dot data is not one dot but eight bits (one byte). As mentioned later, ore-dot data of one sector is supplied as a sub-code and the remaining 24-dot data is supplied as main data.

Thus, when such dot data is supplied to the write signal generator 156, the data is frames same as the data recording process. A configuration is required to discriminate the dot data as white dot or black dot as well as form pits in accordance with the discrimination result. The configuration will be described.

In FIG. 3, a discriminator 1565 determines whether the sub-code data D0 and the 14 bits constituting the main data D1 through D24 are data specifying black dots. The data specifying black dots in the 14-bit data after conversion is data except "01001000100000". The discriminator 1565 determines whether black dots are specified depending on whether the sub-code data D0 and the each 14 bits constituting the main data D1 through D24 are data except "01001000100000".

Next, a time axis expander 1566 is a first-in, first-out buffer memory and writes a valid discrimination result from the discriminator 1565 in synchronization with the slot for the EFM frame as well as reads the written discrimination result in synchronization with the clock signal/Dot to expand the data in the direction of time axis and rearranges the data. The clock signal/Dot is a signal having the cycle (dot period) DT which is about one twenty-fifth the period obtained by subtracting the output period of the synchronization data Dframe and the merging bits immediately after Dframe from the period of one frame. The clock signal/Dot is supplied from the main controller 120.

A gate circuit 1567 causes the signal OENa from the strategy circuit 1563 to pass in the period 24T (output period of the synchronization data Dframe) following the trailing edge of the synchronization signal/EFMsync. In the remaining period, the gate circuit 1567 gates the signal OENa as described below. The gate circuit 1567 causes the signal OENa to pass in case the discrimination result of rearrangement is black dot specification. The gate circuit 1567 interrupts the signal OENa in case the discrimination result of rearrangement is white dot specification. The gate circuit 1567 supplies the signal obtained by gating the signal OENa to the other input end of the switch 1564. Thus, in case the signal Rec is driven low and image formation is instructed, the signal OENb from the gate circuit 1567 is supplied to the laser driver 170.

<Image Forming Operation>

Figure 8:
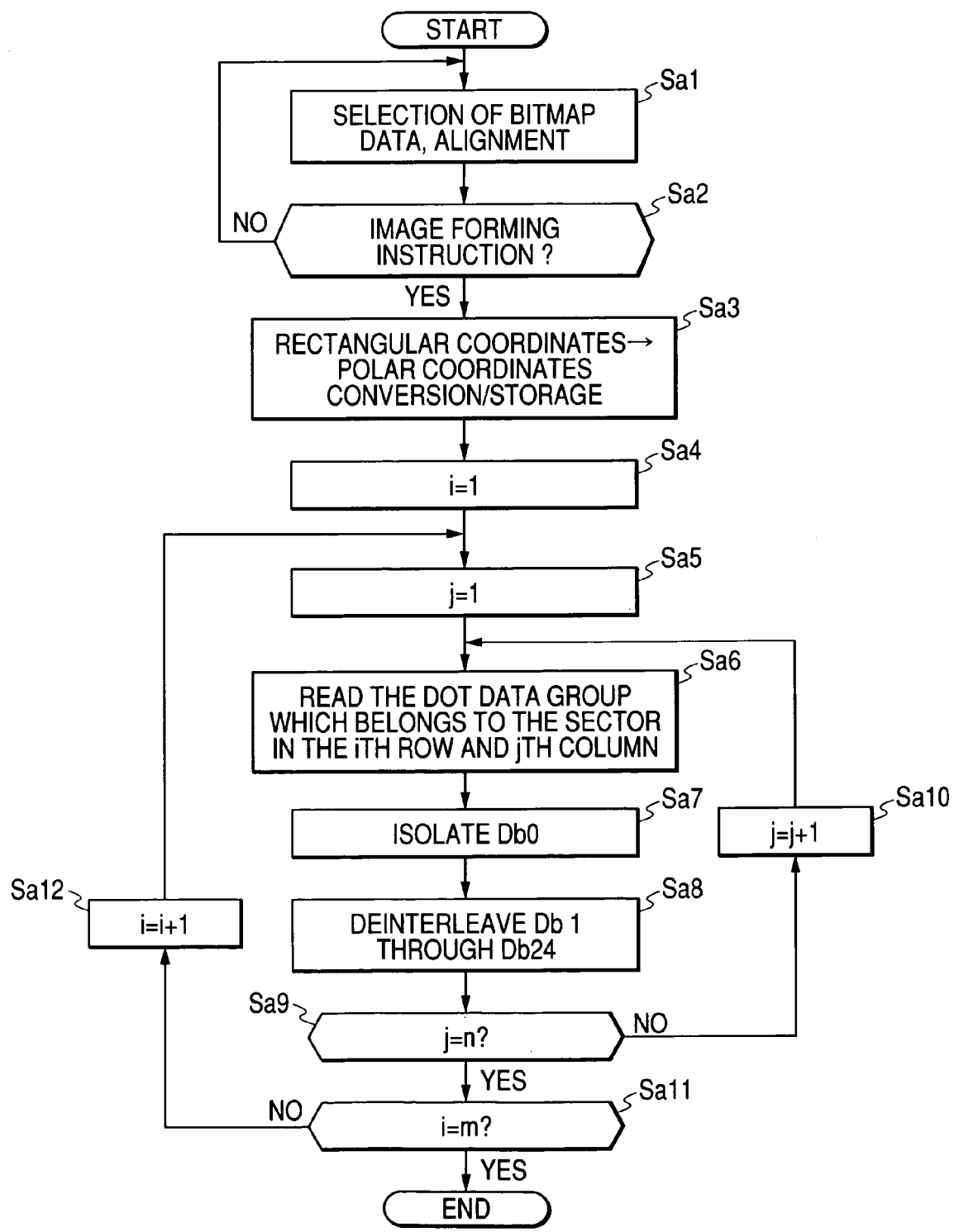
FIG. 8 is a flowchart showing the operation of a host computer in image formation.

Next, operation of image formation in the system 1 will be described. When the user performs predetermined operation using the operating section of the host computer 10, the application program for image forming stored in the HDD 26 is started. FIG. 8 is a flowchart showing the procedure to execute this program.

The CPU 20 executes edit processing such as selection, editing and positioning of an image (step Sa1). To be more precise, the CPU 20 displays the outer shape of the optical disk 200 on the display 28 and lets the user select a target image, and displays a message instructing the position on the optical disk on the screen for image formation. The user arranges the image on the optical disk by way of cut & paste or changes the image by way of rotation and scale-down as required. The CPU 20 repeats this edit processing until an image forming instruction is issued (step Sa2). In other words, an image forming instruction determines the image to be formed on the optical disk 200 and its position on the same.

Figure 9A:
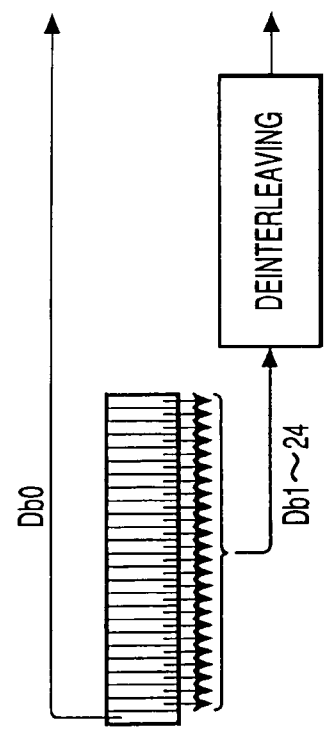
FIGS. 9A to 9C show functional blocks of the host computer in image formation.
Figure 9B:
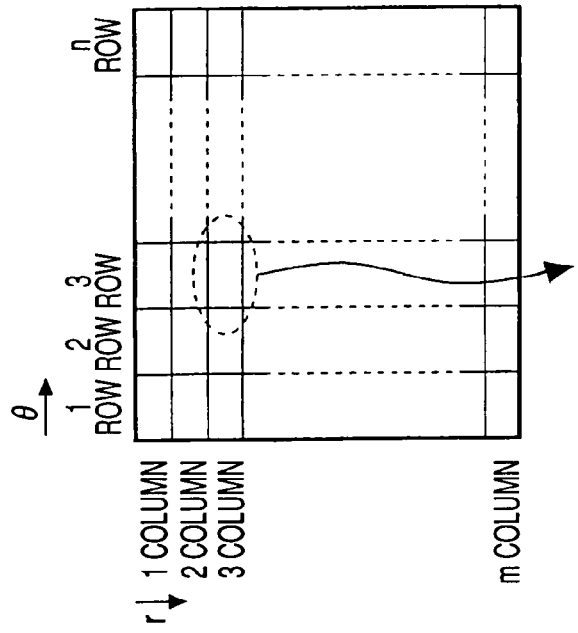

Dots of image data are defined in the rectangular coordinate system while dot arrangement on the optical disk 200 is defined in the polar coordinate system, as shown in FIG. 7A. Thus, the CPU 20, receiving an instruction of image formation, converts the image data in the Rectangular coordinate system to data in the polar coordinate system and temporarily stores the data into the RAM 24 (step Sa3). To be more precise, the CPU 20 determines which of the dots defined in the rectangular coordinate system each of the dots arranged in m rows by 25·n columns on the optical disk 200 belongs to, and determines whether the data instructing the density of dots obtained specifies black dots or not, and uses the determined data as dot data specifying the density of dots in the polar coordinate system. As shown in FIG. 9A, assume that the origin of the Rectangular coordinates is set at the upper left and the direction to the right and the direction to the bottom as positive direction of X coordinate and positive direction of Y coordinate respectively. When the center of an optical disk having the radius R is positioned at Rectangular coordinates (R, R), the Rectangular coordinates $(x, y)=(R+R\cdot\sin\theta, R-r\cdot\cos\theta)$ holds. The 25-dot data which belongs to one sector is stored into the RAM 24 in a matrix in r distance and θ direction in the polar coordinates as shown in FIG. 9B. The CPU 20 specifies a white dot as "00000000" while it specifies a black dot as any data randomly generated other than "00000000".

Next, the CPU 20 sets '1' to a variable i for identifying the target sector row (step Sa4) and sets '1' to a variable j for identifying the target sector column (step Sa5). The CPU 20 reads 25-dot data which belongs to the sector in the ith row and jth column (step Sa6). This acquires the 25-dot data which belongs to the sector identified by the variables i, j at the present point in time. In case the processing of step Sa6 is executed for the first time, dot data of a sector in the first row and first column is read.

Figure 9C:
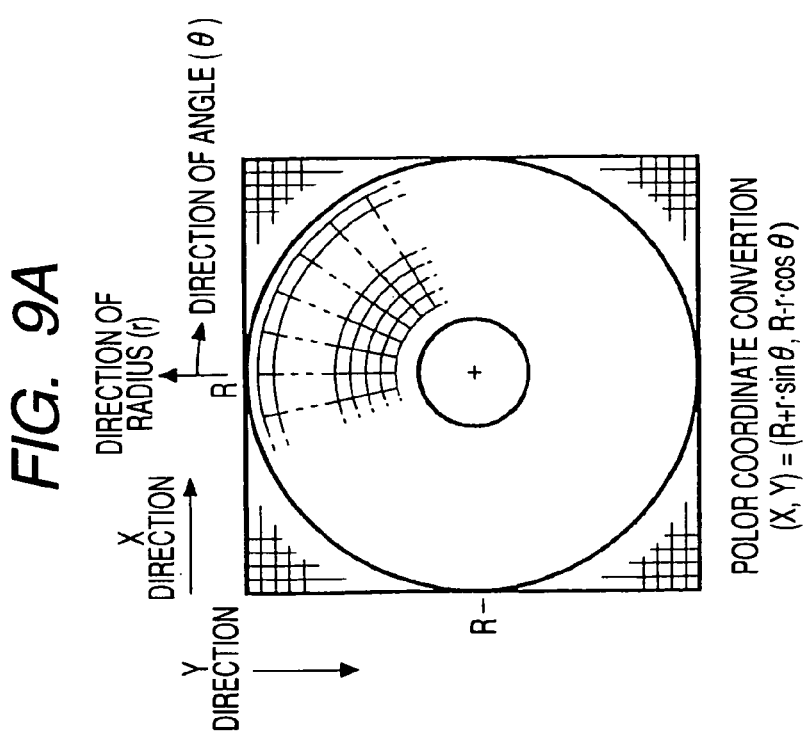
Figure 10:
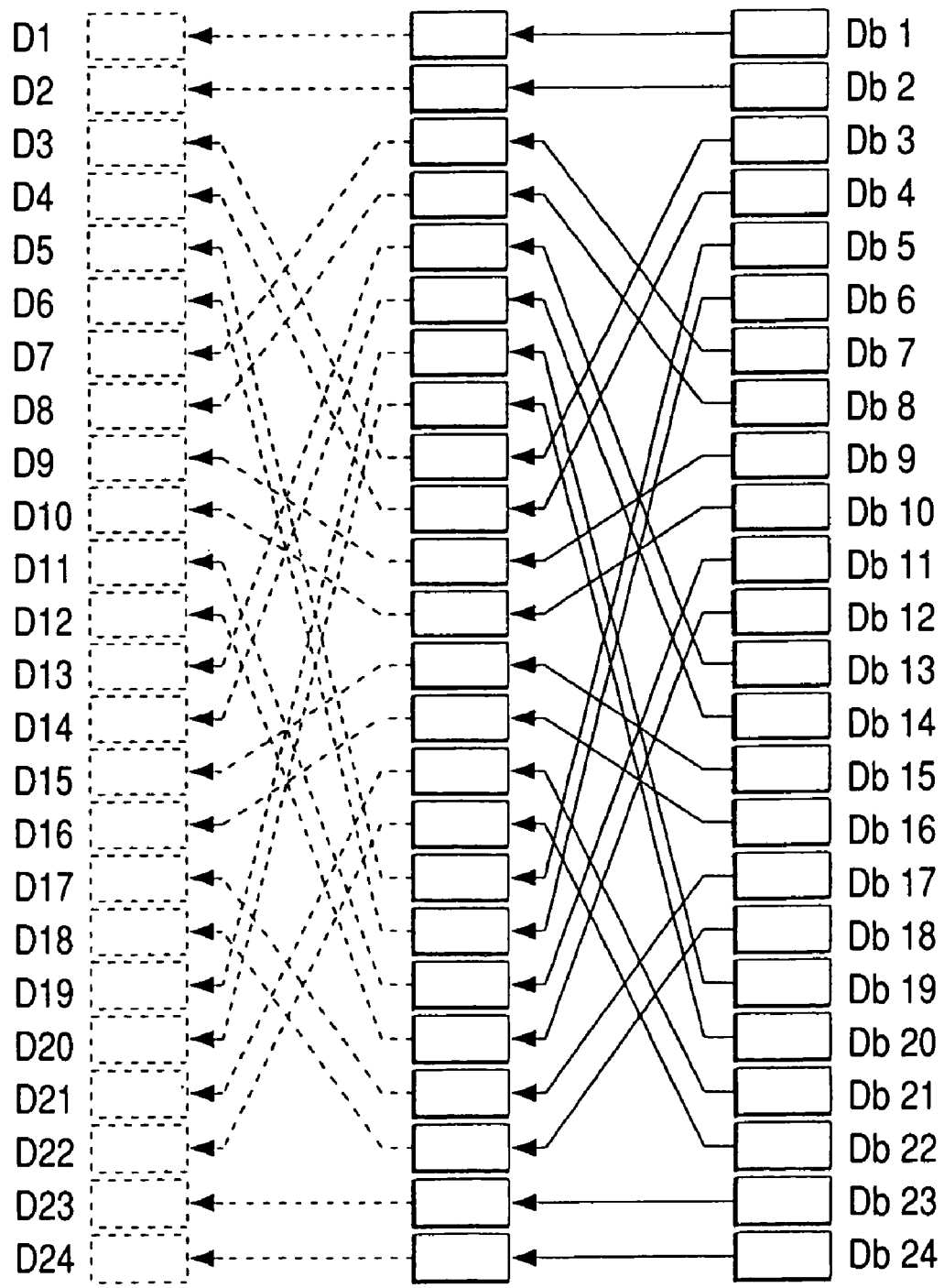
FIG. 10 shows the deinterleaving process in the functional blocks.

Further, as shown in FIG. 9C, the CPU 20 isolates the dot data whose θ component is the smallest out of the read dot data and supplies the dot data as sub-code data to the optical disk apparatus 100 (see step Sa7 in FIG. 8). Meanwhile, the CPU 20 performs deinterleaving of dot data Db1 through Db24 and supplies the resulting data to the optical disk apparatus 100 (see step Sa8 in FIG. 8). The contents of the deinterleaving is reversal of the processing in the interleaver 1561 in the optical disk apparatus 100 (see FIG. 4), as shown in FIG. 10.

When processing the 25-dot data which belong to one sector, the CPU 20 determines whether the variable j is equal to n, the maximum value of the number of columns (step Sa9). In case the determination result is negative, the CPU 20 increments the variable j by "1" in order to move the target sector to next column (step Sa10) and returns to step Sa6. In case the determination result is affirmative, the CPU 20 further determines whether the variable i is equal to m, the maximum value of the number of rows (step Sa11). In case the determination result in step Sa11 is negative, the CPU 20 increments the variable i by "1" in order to move the target sector to next row (step Sa12) and returns to step Sa5. In case the determination result in step Sa11 is affirmative, that means processing is over up to the final sector in the mth row and nth column. The CPU 20 then terminates the program.

By the circulation of the steps Sa4 through Sa12, a sector to be processed shifts in the order of first row and first column, first row and second column, . . . , first row and nth column, second row and first column, second row and second column, . . . , second row and nth column, third row and first column, third row and second column, . . . , third row and nth column, . . . , mth row and first column, mth row and second column, . . . , mth row and nth column. Dot data Db0 of the 25-dot data which belongs to the sector to be processed is extracted as sub-code data while the dot data Db1 through Db24 undergoes deinterleaving and those data are supplied to the optical disk apparatus 100.

Transfer of dot data to the optical disk apparatus 100 uses the RAW mode in which data corresponding to 98 frames is transferred at a time as a single block.

Next, operation of image formation in the optical disk apparatus 100 will be described. Operation of each of the interleaver 1561, encoder 1562 and strategy circuit 1563 is the same as that in data recording except that data is dot data. Thus, dot data supplied from the host computer 10 is stored into the buffer 155 and read in units of 25-dot each time the optical disk 200 turns by a minute angle corresponding to one column. Of the data, the dot data Db0 is directly supplied as sub-code data D0 to the encoder 1562 while the dot data Db1 through Db24 is supplied to the interleaver 1561. Note that, the dot data Db1 through Db24 has been previously deinterleaved by the host computer 10, so that when the data is interleaved by the interleaver 1561, the data is arranged in the order of sample in the EFM frame, as shown in FIG. 10.

The encoder 1562 isolates the dot data Db0 as sub-code data D0 as well as frames the dot data Db1 through Db24 rearranged in the order of the sample as main data D1 through D24. In the framing process, the synchronization data Dframe and the parity data P1 through P4 and Q1 through Q4 are added, same as the data recording process. In data recording also, any section of an EFM waveform has a duty ratio of about 50% (see FIG. 5, FIG. 11).

As mentioned above, the discriminator 1565 determines whether each of the sub-code data D0 and the main data D1 through D4 14-bit-converted by the encoder 1562 specifies black dots. The synchronization data Dframe and parity data P1 through P4 and Q1 through Q4 added in framing are meaningless in image formation. Thus, the discriminator 1565 inputs the clock signal CLK and the synchronization signal/EFMsync to detect the chronological position in the frame, same as the encoder 1562. The discriminator 1565 outputs a signal representing that the above discrimination result is valid only in case the detected chronological position is the output period of the sub-code data D0 and the main data D1 through D24 and the above discrimination result is invalid in case the position is the output period of the synchronization data Dframe and the parity data P1 through P4 and Q1 through Q4. It is considered that discrimination takes time on the discriminator 1565 so that the output of the discriminator 1565 is output after a delay of one slot (17T).

Figure 11:
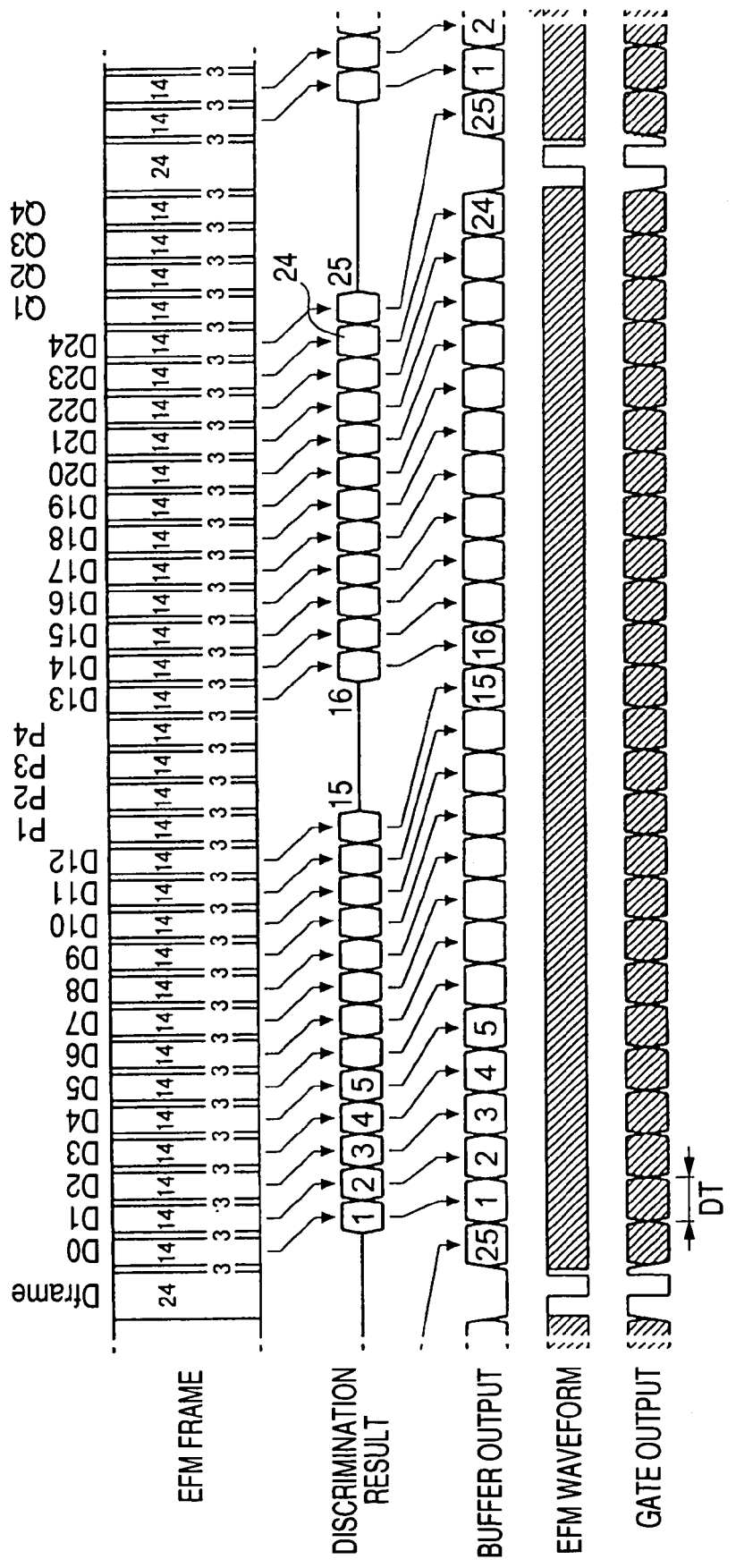
FIG. 11 is a timing chart showing the image forming operation in the optical disk apparatus.

The output result of the discriminator 1565 is shown in FIG. 11. The stick in FIG. 11 indicates that the discrimination result of the 14-bit data output in the slot period of the synchronization data Dframe and the parity data P1 through P4 and Q1 through Q4 is invalid. Thus the valid discrimination result is arranged unevenly over a single frame. The resulting data is temporarily written into the time axis expander 1565 then read out in synchronization with the clock signal/Dot so that the slot period of the parity data P1 through P4 and Q1 through Q4 is shortened as shown in FIG. 11. As a result, the data is rearranged almost evenly over a single frame except the slot period of the synchronization data Dframe.

When the discrimination result is white dot specification, the gate circuit 1567 is closed over the period when the data is rearranged. Thus laser light is applied at the servo level so that no pits are formed and the reflectivity of the recording layer remains unchanged.

When the discrimination result is black dot specification, the gate circuit 1567 is open over the period DT when the data is rearranged, that is, over the 100% period of the period DT. Thus laser light enters the write level when the signal OENb output in the period is high, so that pits are formed on the optical disk 200. The signal OENb is a signal corrected by the strategy circuit 1563 so that pits will be formed in accordance with the EFM waveform. Any section of the EFM waveform irrespective of EFM data has a duty ratio of 50%. Thus the ratio of the sum of the lengths of pits formed by way of thermochromism to the sum of the lengths of lands whose color has not changed is about 50%. That is, the discrimination result output from the time axis expander 1566 is rearranged so that the waveform section not related to the EFM waveform as criteria for the discrimination result is extracted by the gate circuit 1567 to form pits in accordance with the waveform section. When a waveform section not related to the discrimination result is extracted to form pits in accordance with the waveform section, the resulting ratio of pit to land is 1:1.

Figure 12:
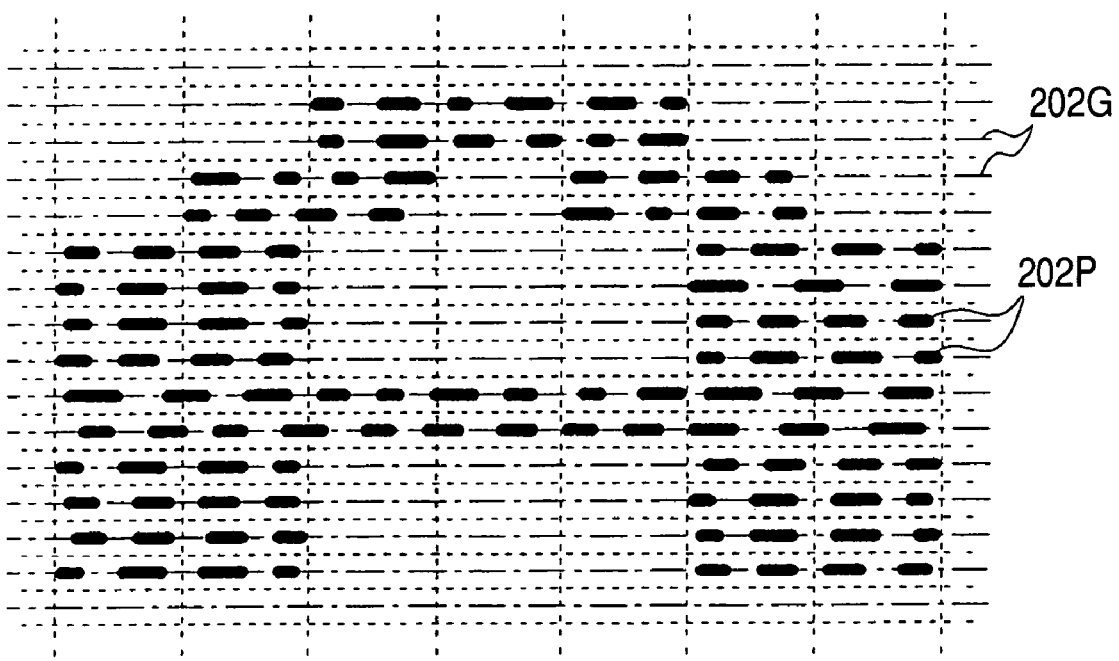
FIG. 12 is a partial enlarged view of the optical disk which shows an example of an image formed by the optical disk apparatus.

FIG. 12 is a partial enlarged view of the optical disk 200 on which pits are formed, where the character "A" is displayed. Pits 202P are formed along the pre-grooves 202G on the optical disk 200 by way of tracking control. The ratio of the pits 202P to a single dot is a constant value of about 50%. From a macroscopic viewpoint, black dots are of the same density.

According to the first embodiment, the configuration required to add the image forming feature comprises the discriminator 1565, time axis expander 1566, gate circuit 1567 and the switch 1654. This does not complicate the configuration of the optical disk apparatus 100 thus preventing an increase in the device cost. The length of a sector in the direction of perimeter is 163 µm when the linear velocity is a maximum of 1.2 m/second at the outermost perimeter. In this embodiment, 25 dots in a sector are arranged in the direction of the perimeter so that sufficient resolution is obtained. The length of a sector in the direction of perimeter is 163 µm because 24-byte main data is stored in one frame, which data corresponds to six-sample audio data in two channels of 16 bits and the sampling cycle is 44.1 kHz so that one cycle of one frame is 136 µsec.

Data stream in image formation is the same as that in data recording except that the steam branches to the discriminator 1565, time axis expander 1566 and the gate circuit 1567. Thus, the time required for image formation is nearly the same as the time required for data recording as long as the data amount is the same, without taking a long time for image formation.

The gate circuit 1567 causes the signal OEN to pass in the period when the synchronization data Dframe is output, so that pits are formed on the optical disk 200 in a pattern corresponding to the synchronization data Dframe. It is considered that this has little influence on the visibility of an image formed on the optical disk 200. The synchronization data Dframe necessarily includes the write level irradiation period so that it can be used for processing such as the above-mentioned power control in the period. The synchronization data Dframe may be omitted same as the parity data P1 through P4 and Q1 through Q4 in order to extend the period DT.

<Application of First Embodiment>

While dots are either white or black in the first embodiment, representation of halftones is made possible by adding the following configuration. For example, in case 50% halftone (gray) is represented against black, the discriminator 1565 incorporates a feature to discriminate dot data which specifies the gray. Alternatively, a separate discriminator is added and in case the discrimination result is dot data which specifies gray, a configuration to reduce the gate period to 50% the dot period DT is added. To be more precise, the signal OENb may pass only in the period specified by the dot data out of the dot period DT. Similarly, support for a plurality of separate halftones will allow representation of multiple densities.

<Second Embodiment>

While it is possible to form an image onto an optical disk in the first embodiment, the data recording configuration needed slight addition. The second embodiment which requires little change in the hardware configuration is described below.

Figure 13:
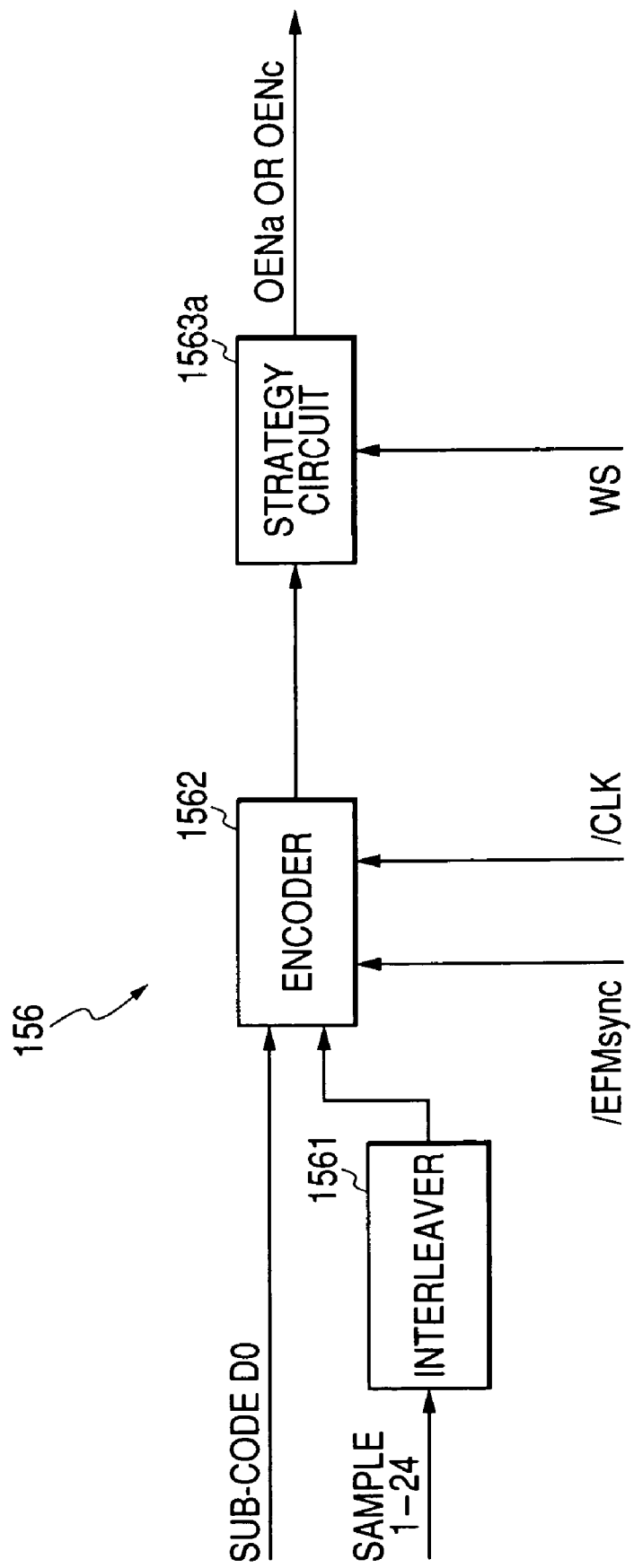
FIG. 13 is a block diagram showing the configuration of the write signal generator in the optical disk apparatus according to the second embodiment of the invention.

FIG. 13 is a block diagram showing the configuration of the write signal generator 156 according to the second embodiment. As shown in FIG. 13, different from the configuration shown in FIG. 3, the second embodiment does not involve the discriminator 1565, the time axis expander 1566, the gate circuit 1567 and the switch 1564. In the strategy circuit 1563a, correction in image formation is modified from the correction in data recording by the instruction information WS from the main controller 120. Other configuration of the second embodiment is the same as is in the first embodiment.

In the second embodiment, in case dot data is $D2 (hexadecimal notation), a white dot is specified. In case dot data is $82, a black dot is specified. $D2 refers to "10001001001001" in terms of 14-bit data after conversion, and a pattern which makes level transition at the section "/" of /4T/3T/3T/3T/ in terms of an EFM waveform. Similarly, $82 refers to "10000100001001" in terms of 14-bit data after conversion, and a pattern which makes level transition at the section "/" of /5T/5T/3T/ in terms of an EFM waveform. These two 14-bit data items start and end with "1". As merging bits inserted between these data items, only "000" satisfying two or more successive 0s between 1s out of the four patterns is selected.

When only $S2 and $82 are used as dot data Db0 through Db24, only the pattern 3T, 4T, 5T appears in the slot period from the sub-code data D0 to the main data D12 and the slot period from the main data D13 to the main data D24, including merging bits.

The strategy circuit 1563a, considering the appearance of this pattern in image formation, corrects the EFM waveform in accordance with the following rule and outputs the resulting waveform as a signal OENc.

Figure 14:
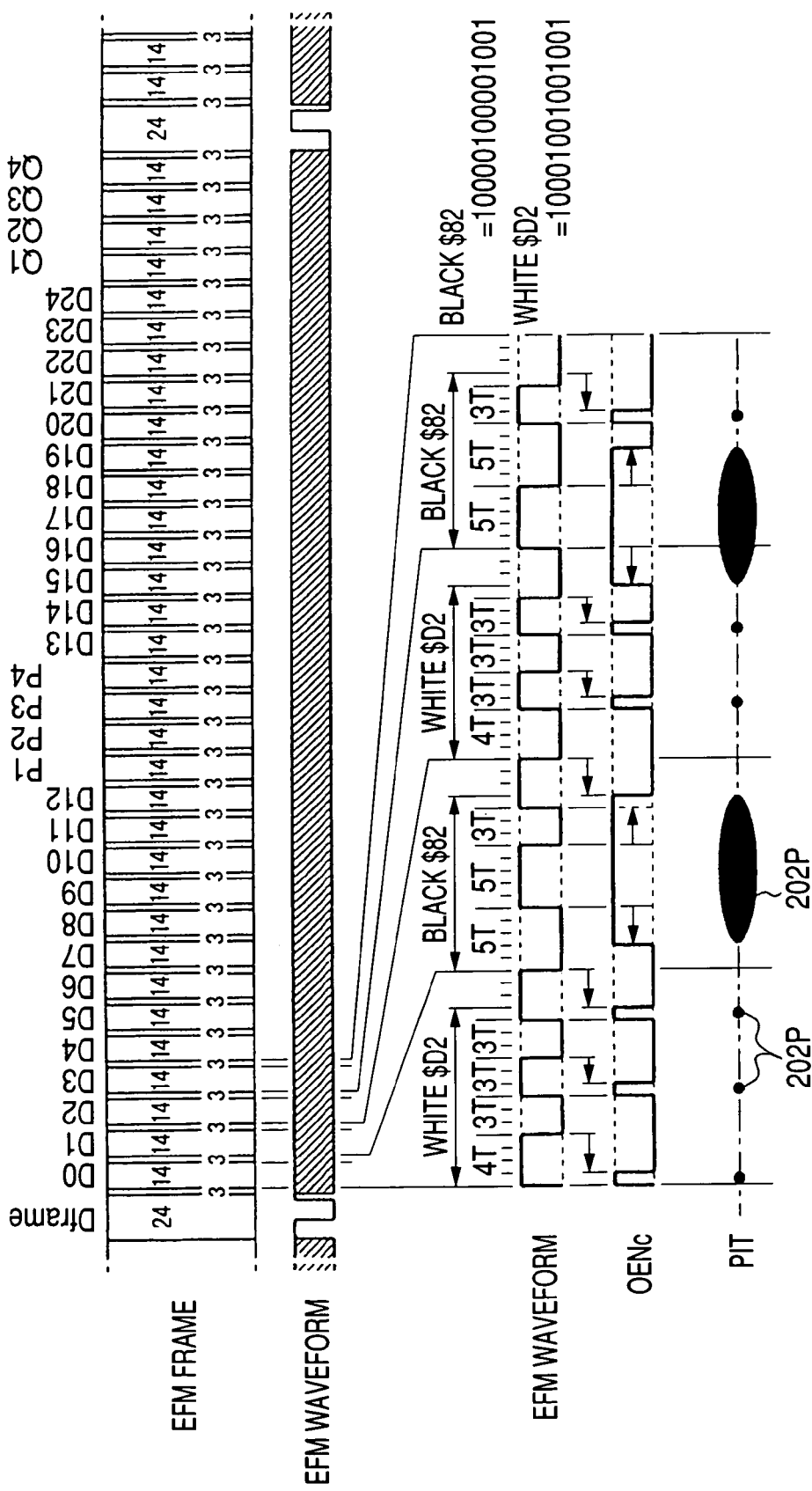
FIG. 14 is a timing chart showing the image forming operation in the optical disk apparatus.

That is, in image formation, in case the positive pulse width (High level period) of the EFM waveform is 3T or 4T as shown in FIG. 14, the strategy circuit 1563a leaves 1T at the front edge and deletes 2T or 3T at the rear edge. In case the positive pulse width is 5T, the strategy circuit 1563a extends the High level period by 3T forward and backward of the period to obtain 11T and outputs the pulse 11T as a signal OENc.

According to the second embodiment, when the signal OENc corresponding to white dot data is supplied to the laser driver 170, the pits 202P accordingly formed are shortened with a small change in density as shown in FIG. 14. When the signal OENc corresponding to back dot data is supplied to the laser driver 170, the pits 202P accordingly formed are thick with a considerable decrease in reflectivity as shown in FIG. 14. This enhances the contrast ratio.

The parity data P1 through P4 and Q1 through Q4 is determined by the contents of the dot data Db0 as sub-code data D0 and Dot data Db1 through Db24 as the main data D1 through D24, and thus cannot be identified. Correcting the patterns of 6T through 10T to make thinner pits, same as 3T, 4T makes inconspicuous the pits formed in the slot period of the parity data P1 through P4 and Q1 through Q4, just like white dots.

In case a pattern whose positive pulse width is 5T accidentally occurs as parity data, thick pits are formed by the pattern. The probability of this case to happen is not so high and the influence on the quality of an image is rather small. Similarly, the probability of the patterns 6T through 10T to happen is not so high. Thus, influence on the quality of an image is rather small without the strategy circuit 1563a correcting the patterns 6T through 10T.

The pattern of 11T is used for processing such as power control by way of the synchronization data Dframe, same as the first embodiment. A configuration is also possible where the strategy circuit 1563a does not correct the 11T pattern but makes correction so that the pits will be shortened for 11T unless there is any specific application.

While white dots are specified when dot data is $D2 and black dots are specified when dot data is $82 in the second embodiment, alternative data may be used as long as the pattern used has 1s on both ends and 1s almost equidistantly.

While pits are shortened for white dots and elongated for black dots, the strategy circuit 1563a may make correction in either case.

Thus, according to the second embodiment, it is possible to form a high-quality image on an optical disk in a relatively short time without adding hardware to a data recording configuration. Therefore, the device according to the second embodiment can be constructed by changing the software (program) installed in a recording medium of the optical disk apparatus or a host computer controlling the optical disk apparatus.

<Application of Second Embodiment>

In the first embodiment, only a section of the EFM waveform is extracted and supplied to the laser driver 170 so that the pit shape is not directly related to dot data. It is thus impossible to define the pit interval based on dot data. Meanwhile, according to the second embodiment, pits are directly defined by way of a pattern obtained by converting dot data to 14-bit data. It is thus possible to define the pit interval based on dot data.

When pits are formed at intervals which satisfy a condition, diffraction occurs for the following reason. FIG. 15 is a cross-sectional view of the optical disk 200 along the direction of pits 202P-1, 202P-2. As shown in FIG. 15, the pits 202P-1, 202P-2 are formed so that the interval between the centers thereof will be equal to d. A visible light impinges in the direction of the normal to the optical disk 200. In case the observer observes the recording surface of the optical disk 200 at an angle $\theta_1$ to the direction of the normal, when the difference between the optical path length from the pit 202P-1 to the observer and the optical path length from the pit 202P-2 to the observer is a multiple of an observed wavelength $\lambda$ by an integer n, that is, when $$\sin \theta_1 = n\lambda/d \qquad (1)$$

is satisfied, the observed lights are in phase so that the lights intensify each other, and the observer visually identifies the light of the wavelength as an intense light. In case the recording surface of the optical disk 200 is observed at an angle $\theta_2$, when the optical path difference between the pits 202P-1 and 202P-2 is a multiple of half an observed wavelength $\lambda$ by an odd number m, that is, when $$\sin \theta_2 = m\lambda/2d \qquad (2)$$

is satisfied, the observed lights 180 degrees out of phase so that the lights counteract each other, and the observer visually identifies the light of the wavelength as a dim light.

In the second embodiment, when pits are formed at intervals d with appropriate dot data selected, the observer visually identifies the light having the wavelength $\lambda$ reflected against the pits as an intense light when it is observed at an angle $\theta_1$ and as a dim light when observed at an angle $\theta_2$. It is thus possible to provide a formed image with a kind of hologram effect.

For the CAV system, the dot (pit) interval is elongated as the irradiation position moves from the inner radius toward the outer radius of the optical disk 200. This must be considered in selecting an appropriate dot data (14-bit pattern).

While tracking control is used to form pits along the pre-grooves in the first and second embodiments, rotation of the optical disk 200 may be synchronized with the feed of the pickup 130 thereby forming an image.

While the first and second embodiments employ the CAV system in which the angular velocity is constant, the CLV (Constant Linear Velocity) system in which the linear velocity is constant may be used instead. In this case, it is necessary to consider that sectors are not aligned in radial direction in coordinate conversion. As the optical disk 200, a CR-R as well as various types of recording media such as a DVD can be used.

As mentioned hereinabove, according to the invention, it is possible to form a high-quality image onto an optical disk at a high speed without increasing the device cost.

What is claimed is:

1. An optical disk apparatus for forming an image on an optical disk according to dot data which corresponds to intensity and period of dots of the image, the optical disk apparatus comprising:
    a framing unit which makes a frame data by grouping a plurality of unit data, wherein when the dot data are applied to the optical disk apparatus, the dot data are treated to be the plurality of unit data;
    a pit forming unit which sequentially forms pits defined by a bit train signal of the frame data;
    a discrimination unit which determines whether a section in the frame data corresponding to the dot data is a predetermined value; and
    a gate unit which, in case the discrimination result by the discrimination unit is affirmative, supplies the bit train signal to the pit forming unit in a certain period of the dot period and, in case the discrimination result by the discrimination unit is negative, interrupts supply of the bit train signal to the pit forming unit.

2. The optical disk apparatus according to claim 1, wherein the gate unit supplies the bit train signal to the pit forming unit only in a predetermined dot period required for formation of one dot in the case the discrimination result is affirmative, and interrupts supply of the bit train signal to the pit forming unit in the predetermined dot period.

3. The optical disk apparatus according to claim 2, wherein
    the framing unit, when making the frame data by grouping the plurality of unit data supplied from a host computer, adds parity data to correct a code error of the plurality of unit data and synchronization data, and
    the optical disk apparatus further comprises time axis expander unit which divides, by the number of dot data included in one frame data, at least a period obtained by subtracting a period of the synchronization data from a period in which the framed data is output, and set the divided period as the predetermined dot period.

4. An optical disk apparatus for forming an image on an optical disk according to dot data which defines density of dots of the image, the optical disk apparatus comprising:
    a framing unit which makes a frame data by grouping a plurality of unit data, wherein when the dot data are applied to the optical disk apparatus, the dot data are treated as the plurality of unit data;
    a strategy circuit which corrects a bit train signal of the frame data to form pits defined by the bit train signal on the optical disk; and
    a pit forming unit which applies laser light modulated by the corrected bit train signal and sequentially forms pits onto the optical disk;
    wherein the strategy unit modifies the correction by the strategy circuit so as to shorten or elongate a pit defined by the bit train signal in accordance with an instruction from outside.

5. A computer readable recording medium storing program which causes a computer to which an optical disk apparatus is connected, the optical disk apparatus comprising: a framing unit which interleaves a plurality of unit data corresponding to dot data which specifies density of a dot to be formed onto an optical disk in the order the dot data are supplied and makes a frame data; and a pit forming unit which forms a pit train according to the frame data so that the density specified by the dot data to be processed will be obtained, the program causing the computer to function as:
    an acquisition unit which groups a plurality of dots positioned on the same radius of an image defined in polar coordinates and which acquires dot data defining the density of each of the plurality of dots included in each group; and
    a deinterleaving unit which rearranges the dot data acquired by the acquisition unit and supplies the rearranged dot data to the optical disk apparatus so that the arrangement of dot data after the interleaving will match the arrangement of the dots in the direction of an angle in polar coordinates.

* * * * *